Oct. 31, 1933.  W. C. KARNS  1,933,478
VENTILATOR SCREEN
Filed Jan. 12, 1933
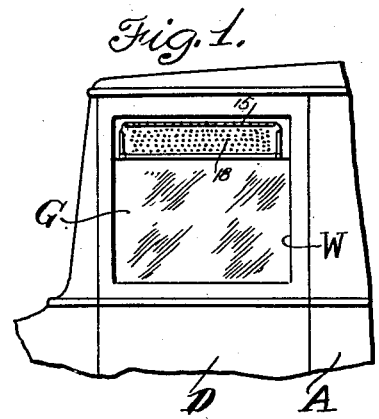
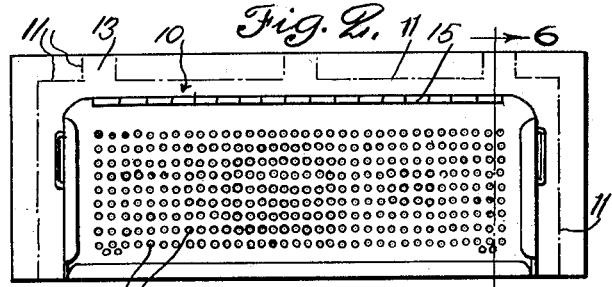
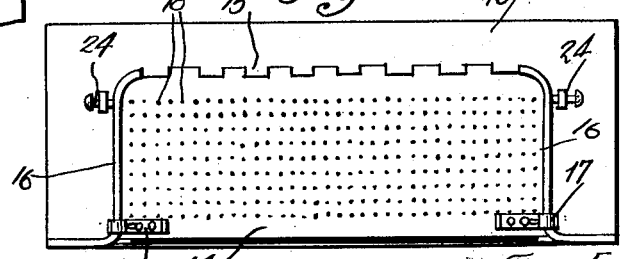
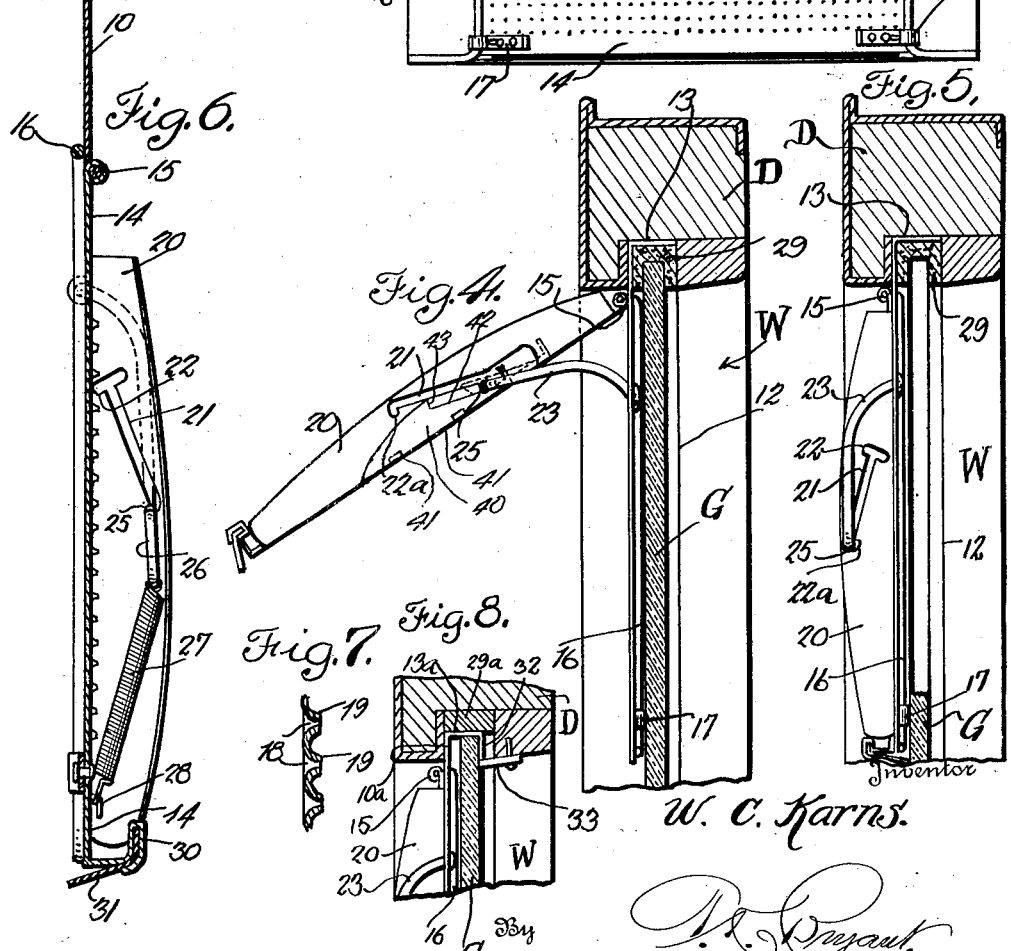

Patented Oct. 31, 1933

1,933,478

UNITED STATES PATENT OFFICE 1,933,478

VENTILATOR SCREEN

William C. Karns, Everett, Pa.

Application January 12, 1933. Serial No. 651,386

4 Claims. (Cl. 296—44)

This invention relates to certain new and useful improvements in ventilator screens.

The primary object of the invention is to provide a ventilator screen for use wherever desired in the form of a sheet or plate of any desirable material that has holes or openings punched therein in simulation of a nutmeg grater presenting ragged or broken edges or flanges surrounding the openings and projecting from one side of the plate or sheet for the more effective breaking up of a stream of air flowing through the ventilator screen and operating to permit complete ventilation in the absence of all draft.

A further object of the invention is to provide a ventilator screen of the foregoing character that is effective to prevent passage of water therethrough, as well as mist or vapor.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a fragmentary side elevational view of an automobile with the ventilator screen illustrated as installed in the upper end of a side window opening;

Figure 2 is an outer side elevational view of the ventilator screen illustrated as a combined screen and sun visor;

Figure 3 is an inner side elevational view of the ventilator screen shown in Figure 2, showing the hinged visor screen section and the clamp for retaining the same in closed position with respect to the carrying plate;

Figure 4 is an enlarged fragmentary cross-sectional view of a part of the door of an automobile showing a modified form of the combined ventilator screen and sun visor shifted outwardly to visor position;

Figure 5 is a detail sectional view similar to Figure 4 showing the combined ventilator screen and sun visor in ventilator position;

Figure 6 is a vertical cross-sectional view taken on line 6—6 of Figure 2, showing the spring device for retaining the combined ventilator screen and visor in ventilator position;

Figure 7 is a fragmentary sectional view of a part of the screen ventilator plate showing the ragged or broken edge walls or flanges surrounding the openings of the ventilator screen; and Figure 8 is a detail sectional view of another form of mounting for the ventilator screen and visor.

While it is intended that this ventilator screen be for general application wherever use thereof is desired as for automobiles, buses, railway cars, office buildings, private homes, etc., the same for purposes of illustration has herein been shown as associated with a side window of an automobile, the reference A designating an automobile having a side door D with a window opening W closed by a vertically slidable glass plate G. The combined ventilator screen and sun visor comprises a rectangular plate 10 of standard proportion to be cut away on the dot and dash lines 11 at its marginal edges to accommodate the mounting thereof in the side stiles 12 of the window opening, the cut away portions of the plate providing tabs or lugs 13 for purposes presently to appear.

A relatively large opening is provided in the plate 10 to accommodate the mounting of the combined ventilator screen and sun visor, the screen and visor plate 14 having a piano hinge or any suitable type of hinge connection 15 at one side edge thereof with an edge wall of the opening in the plate, the screen plate 14 being resiliently mounted for normally occupying a position in closed relation to the opening in the plate 10 with the ends of the screen plate 14 extending beyond the ends of the plate opening for abutting relations with the plate 10. As shown in Figure 3, reinforcing beads 16 are located on the plate 10 at each end of the opening therein and these beads are adapted to be engaged by sliding clasps 17 carried by the screen plate 14 for locking the screen from the inside and for retaining the latter in closed position to the carrying plate 10. The screen plate 14 is provided over substantially the entire area thereof with punched out holes or openings 18 that are surrounded by ragged or broken walls or flanges 19 resulting from the punching operation, these broken flanges 19 extending in an outward direction and operating to permit a gentle flow of air through the openings 18 and the elimination of draft as the roughened edges 19 of the openings 18 break up the flow of air and also act to eliminate passage through the openings 18 of water, mist and vapors. The outer side of the screen plate 14 has the appearance of a roughened nutmeg grater.

A tensioning device for normally holding the screen plate 14 in closed condition relative to the carrying plate 10 includes the provision of an end channel flange 20 on each end of the plate 14 extending perpendicularly from the plate with an inclined slot 21 formed in the flange and provided at its upper end with an offset socket 22. A curved arm 23 is positioned outwardly of each angle flange 20 is pivotally mounted as at 24 on the carrying plate 10 at a point above the upper end of the inclined slot 21, the arm 24 carrying an offset portion 25 extending through the slot 21 with the lower end 26 of the arm inwardly of the angle flange 20 engaged with one end of a coiled spring 27 that in turn is anchored at its other lower end as at 28 to the screen plate 14.

As shown in Figures 4 and 5, the combined ventilator screen and sun visor is mounted in the side stile 12 of the door D in which the glass plate G moves and is removably retained in such position by the lugs 13 carried by the carrying plate 10 being bent at right angles to said plate and confined by the packing strip 29. To utilize the ventilator screen as a sun visor, the offset portion 25 of the arm 23 is disengaged from the offset socket 22a at the lower end of the inclined slot 21 and by moving the screen plate 14 after release of the latches 17 upon its hinge mounting 15, the offset portion 25 of the arm 23 is moved through the slot 21 to be received in the offset portion 22 at the upper end of the slot, this movement taking place against the tension of the springs 27. It is obvious that the retaining rods 23 may be moved manually to displace the ends thereof from the slots 22 when it is desired to lower the combined ventilator screen and sun visor, from the position shown in Fig. 4 to the position shown in Fig. 5. As shown in Fig. 4, there is provided a sliding plate 40 adapted to be guided by the flanges 20 which receive lugs 41. Each plate is formed with a cam edge 42 adapted to engage the lower portion 25 of the retaining rod 23. Formed at one end of the cam edge 42 is a projection 43 which is also adapted to engage the lower portion 25 of the rod 23. When it is desired to release the rods 23 to allow the combined sun visor screen and ventilator to move from the position shown in Fig. 4, to that as shown in Fig. 5 the plate 40 is manually moved longitudinally with the flange 20 whereby the cam edge 42 will engage the lower portion 25 of the rod 23 and move it out of the slot 22. As the combined ventilator screen and sun visor is being lowered, the projecting edge 43 is engaged by the portion 25 of the rod to move the plate 40 to its initial position. The use of the device as a ventilator screen is shown in Fig. 5, the window glass G being lowered while the screen plate 14 assumes the closed position relative to the opening in the carrying plate 19 and is so retained by the springs 27 associated with the arms 23, whereby said springs will at all times create a pressure on the flanges 20 in slots 21 for holding it up or down so that a slight pressure in either direction will release the catches without the necessity of touching arms 23 making the operation thereof entirely automatic, it being noted that the lower end of the screen plate 14 is flanged as at 30 and carries a rubber strip 31 for engagement with the glass G to provide a water and air seal between the lower end of the device and the glass.

In the form of the invention illustrated in Figure 8, the combined ventilator screen and sun visor may be mounted either stationary or for movement with the glass G, the lugs 13a at the upper edge of the carrying plate 10a being bent for engagement with the lower face of the packing strip 29a and further carrying a depending extension 32 engageable by a pivoted keeper 33 carried by the head rail of the window opening W. The lugs 13a and depending extensions 32 carried thereby are directly engaged with the upper edge of the door glass G and when the pivoted keeper 33 is disengaged from the mounting lugs for the device, the latter moves downwardly with the glass G when the same is lowered.

From the above detailed description of the invention, it is believed that the construction and operation thereof will at once be apparent, and while there are herein shown and described the preferred embodiments of the invention, it is nevertheless to be understood that minor changes may be made therein without departing from the spirit and scope of the invention as claimed.

I claim:—

1. In a combined ventilator screen and sun visor, a carrying plate, a ventilator screen hinged to the plate, said screen having key slot openings therein, arms pivoted to the plate and having offset portions extending through the key slots and springs anchored to the screen and attached to the offset portions of the arms for normally holding the screen in parallel ventilator relation to the plate.

2. In a combined ventilator screen and sun visor, a carrying plate, a ventilator screen hinged to the plate, said screen having key slot openings therein, arms pivoted to the plate and having offset portions extending through the key slots and springs anchored to the screen and attached to the offset portions of the arms for normally holding the screen in parallel ventilator relation to the plate, and said screen being movable on its hinge mounting against spring tension thereon and retained by the arms engaged in the key portions of the slots in visor position.

3. In a combined ventilator screen and sun visor, a carrying plate, a ventilator screen hinged to the plate and having openings punched therein and surrounded by flanges having serrated edges directed in opposition to the direction of flow of air through the ventilator screen, said screen having key slot openings therein, arms pivoted to the plate and having offset portions extending through the key slots and springs anchored to the screen and attached to the offset portions of the arms for normally holding the screen in parallel ventilator relation to the plate.

4. In a combined ventilator screen and sun visor, a carrying plate, a ventilator screen hinged to the plate and having openings punched therein and surrounded by flanges having serrated edges directed in opposition to the direction of flow of air through the ventilator screen, said screen having key slot openings therein, arms pivoted to the plate and having offset portions extending through the key slots and springs anchored to the screen and attached to the offset portions of the arms for normally holding the screen in parallel ventilator relation to the plate, and said screen being movable on its hinge mounting against spring tension thereon and retained by the arms engaged in the key portions of the slots in visor position.

WILLIAM C. KARNS.